Patented May 20, 1952

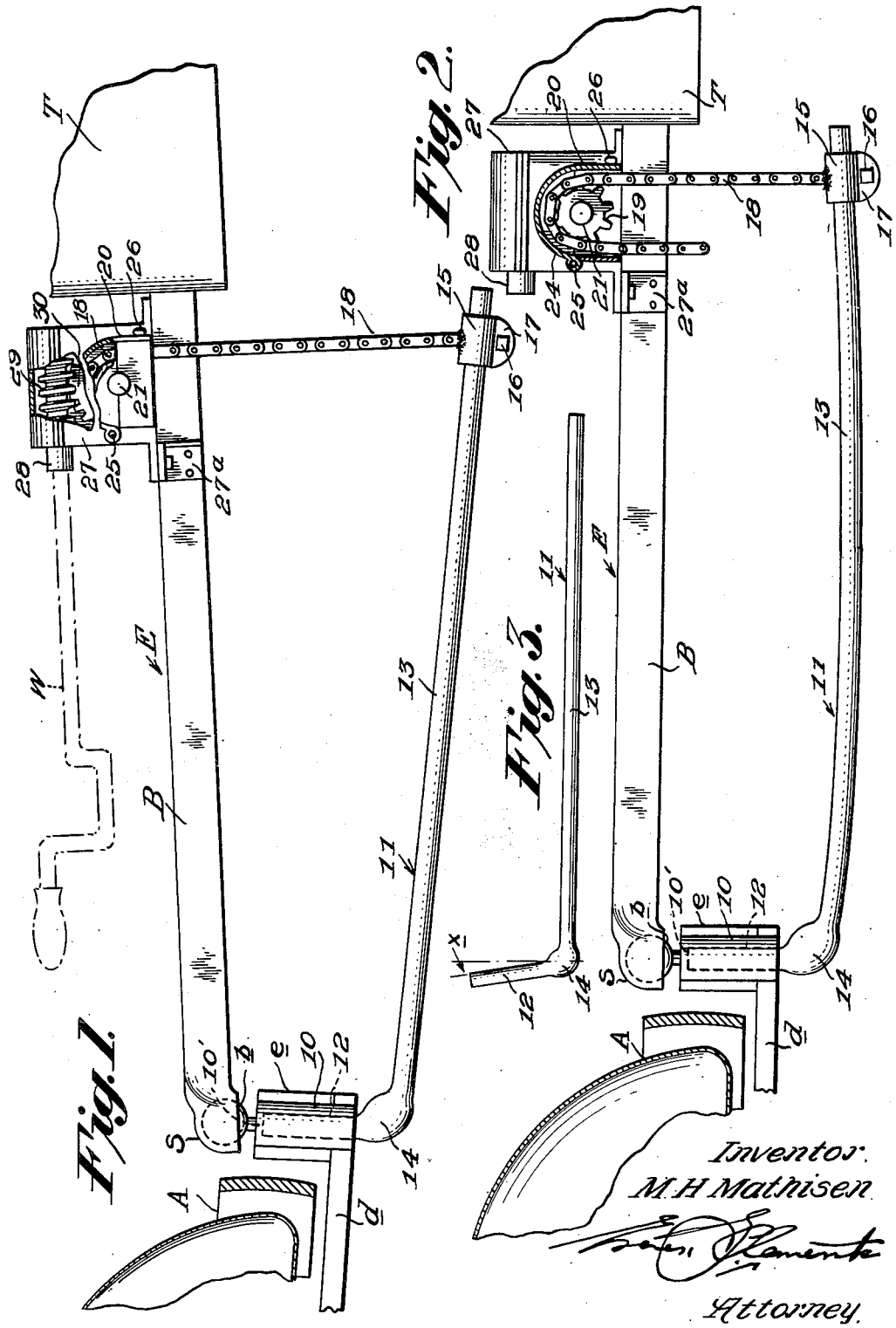

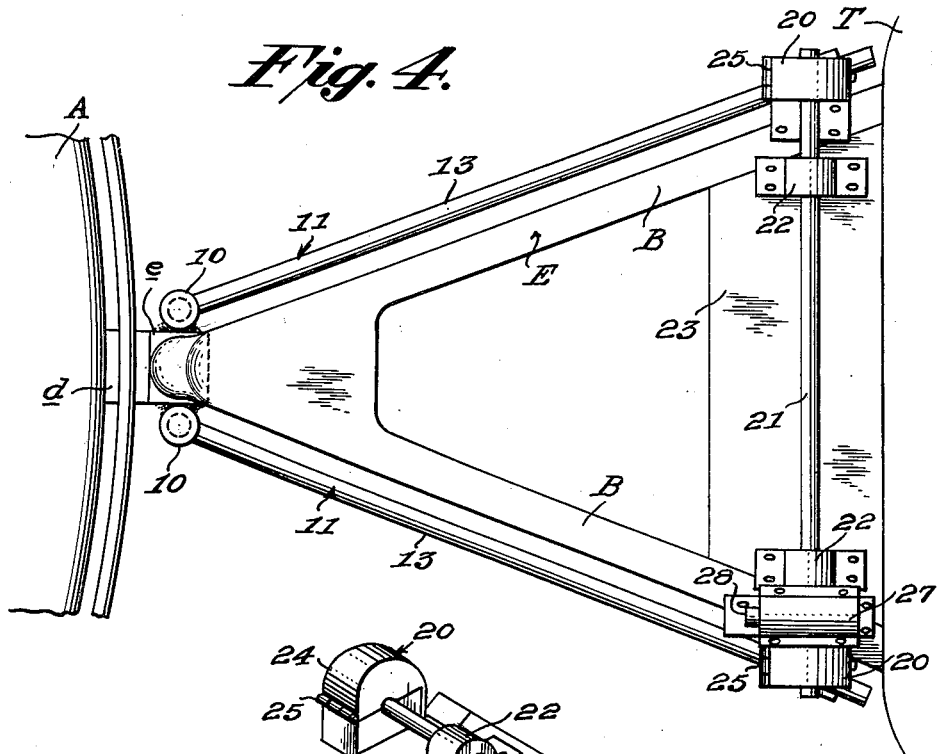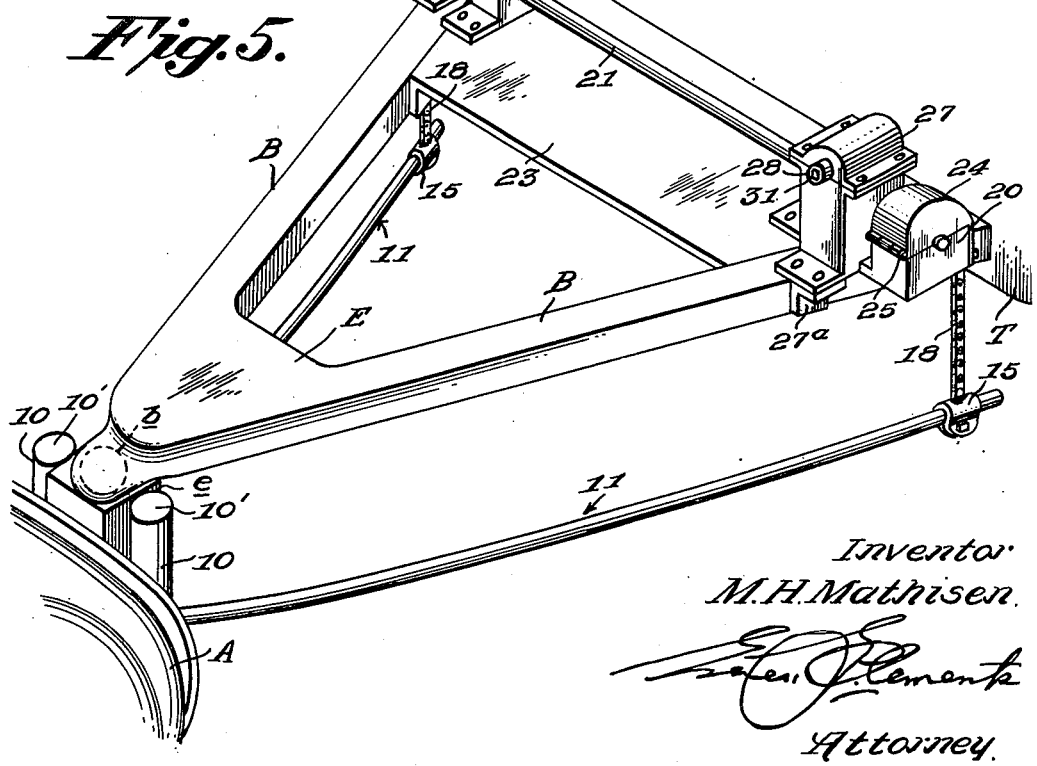

2,597,657

UNITED STATES PATENT OFFICE 2,597,657

SAFETY LOAD EQUALIZING AND DRAFT STABILIZING COUPLING DEVICE FOR AUTOMOBILE TOWED TRAILERS

Martin H. Mathisen, North Hollywood, Calif.

Application June 25, 1951, Serial No. 233,424

9 Claims. (Cl. 280—33.9)

This invention relates to improvements in a safety load equalizing and draft stabilizing coupling device for automobile towed trailers, which device comprises essentially a drawbar equipped with ball and socket providing an articulated draft connection between the automobile and trailer.

In devices of this character which must not only provide quick and easy attachment and detachment of the vehicles but which must also permit the required relative movements between these vehicles, it has been found that such a connecting device must also possess other required features for greater safety, comfort and economy in operation.

Such features comprise, a safety hitch as auxiliary to the ball and socket connection, which it spans; an intermediate manually operable draft bar and trailer frame lifting and sag preventing device; a resilient support for these articulated connected parts; draft equalizing and sway preventing means; and manual adjustable as well as self tensioning means associated with opposite sides of the articulated connection for righting and automatically aligning the draft and tow devices under all road and operating conditions.

Where the wheels of the trailer are disposed rearwardly of the center of load, which is generally the case, the unbalanced weight is transferred through a sagging articulated drawbar connection to exert downward pressure on the extreme rear end of the automobile frame. The result is to greatly overload the rear wheels of the automobile and to proportionately reduce the weight on the front wheels to a point where steering becomes difficult and unsafe.

An example of such unbalancing of the wheel loads may be observed from the following:

Point of weighing with trailer attached: Pounds
    Front wheels _____ 1900
    Rear wheels _____ 3900

A primary object of the invention is, therefore, to provide a readily operable, quick detachable draft coupling including the usual ball and socket connection and a resilient and self-tensioning draft and auxiliary supporting means operatively associated therewith whereby the draft end of a two-wheel trailer, for instance, may be quickly and readily raised and aligned with the frame of the towing automobile without the aid of accessories or dollies. Said means serving to function thereafter to resiliently support, equalize and distribute the added down weight over all four wheels of the automobile.

A further object of the invention is to provide selective and individually adjustable lifting, leveling and automatic self-tensioning means at opposite sides of the drawbar and its articulated connection with the trailer, to compensate for variations in trailer drawbar weight, list and tendency to sway.

A still further object of the invention is to provide a supplemental trailer coupling device which spans the ball and socket connection providing a safety coupling device, which in itself is operative to raise and resiliently support the usual sagging ball coupling and draftbar between a two-wheel or other unbalanced trailer and the connected automobile, as well as to automatically stabilize and maintain straight line draft between the trailer and automobile under abnormal tendencies toward side sway and bounce.

Another object of the invention is to provide a hitch device of the character above referred to which is simple in construction and which is readily applicable as an attachment to automobile-trailer hitches now in use.

A more specific object of the invention is to provide an improved load raising and equalizing structure in association with the connection between the free end of a drawbar projecting from the rear of an automobile and the front end of a forwardly projecting frame extension on a trailer and which structure is particularly characterized in that it includes a pair of elongated resilient rods which at corresponding ends have pivotal connections with the drawbar at opposite sides of the pivotal connection between the drawbar and extension and which rods are maintained under substantial tension by flexible members depending from the extension adjacent the trailer body and whose lower ends are adjustably connected to the rear ends of the rods, and the stressed or tensioned rods in their normal operative position being under minimum stress and relative movement between the automobile and trailer placing the rods under greater stress whereby they react toward normal position.

Other objects and advantages of the invention will become apparent in the course of the following detailed description, taken in connection with the accompanying drawings, wherein:

Fig. 1 is a side elevational view of the device showing same connected with the usual automobile-trailer hitch in its inoperative sagging position, which it assumes at the time of making or breaking connection between the automobile and trailer;

Fig. 2 is a view similar to Fig. 1 but showing the device in its raised or operative load equalizing position;

Fig. 3 is an elevational view of one of the two weight and tension equalizing rods included in the device;

Fig. 4 is a top plan view of the tapering forward end of a trailer frame and an associated automobile drawbar hitch showing the improved device operatively associated therewith;

Fig. 5 is a perspective view of the assembly and improved device in operative association with an automobile-trailer hitch, as shown in Fig. 4 and tensioned for normal draft or towing operation.

Referring now in detail to the drawings, T designates a trailer and A designates a draft automobile. The trailer T is provided with the usual hitch extension E including outwardly converging frame members in the form of beams B, the forward ends of which are jointed to provide a coupling member S. This coupling member is hollowed out at its underside to provide the usual downwardly opening socket for receiving the ball coupling $b$ carried by an upward extension $e$ of a drawbar $d$ suitably secured to the frame of an automobile A, beneath the rear end of the body thereof.

In the absence of load equalizing means this articulated connection between an automobile and trailer appears substantially as shown in Fig. 1, wherein the pivotal connecting member S, $b$ are substantially below the rear end of the extension E. This sagging condition is caused by the unbalanced forward end of the trailer forcing the rear end of the automobile down under substantial weight with a corresponding reduction of weight on the front wheels of the automobile. The condition just described has been recognized and many devices have been proposed to overcome same with only partial results.

It is, therefore, the purpose of this invention to eliminate the sag of the usual ball and socket pivotal connection between an automobile and a trailer with a resulting distribution of weight over the front and rear wheels of the automobile, as well as the displacement of weight to the rear of the trailer.

The improved structure according to this invention comprises a sleeve or socket member 10 which is rigidly secured, as by welding, to each side of the draftbar extension $e$ with their vertical axes parallel and in transverse alignment with the vertical axis of the ball $b$.

The improved construction further includes a pair of resilient rods 11 which have sleeve engageable angular end bearing portions 12 which, as indicated in Fig. 3, have their axes at a substantial angle $x$ to a plane normal to the axis of the body portions 13 of the rods.

These bearing end portions 12 are freely receivable in the lower open ends of the sleeves 10 and whose upper ends are closed as indicated at 10' to serve as thrust bearings for the free ends of the end portions 12 and the end portions are supported within the sleeves for rotation about vertical axes.

The rods 11 are reenforced at the elbows between portions 12 and 13 by substantially thickening same, as is indicated at 14, for a purpose later to appear.

The rods 11 are further provided with collars 15 adjacent their rear ends and which collars are adjustable therealong and secured to the rods as by means of bolts 16, extending through ears 17.

A flexible member, herein shown as a sprocket chain 18, has its lower end rigidly secured to each collar 15, by any suitable means and the chains extend over sprocket wheels 19 disposed within casings 20 through which extends a shaft 21, supported by and projecting laterally of the beams B and to which the sprocket wheels are secured. The shaft 21 is supported in suitable bearings 22 which are rigidly supported on a base plate or other frame member 23 disposed between and suitably rigidly secured to the rear ends of the beams B.

As is more clearly indicated in Fig. 2, the casings 20 preferably include arched covers 24 which are pivotally connected to the body portions thereof as at 25. The purpose of having access to these sprockets is for adjustably placing the chains thereon as occasion may require. The covers are preferably provided with knobs 26 for facilitating the raising and lowering thereof.

As is further shown in Fig. 2, the walls of the casings below the pivots 25 prevent displacement of the free ends of the chains from operative engagement with the sprocket wheels. Means are provided for imparting rotation to the shaft 21 and such means in an acceptable form may comprise a housing 27, disposed between one of the casings 20 and an adjacent shaft bearing 22.

Rotatably supported in the housing 27 is a shaft 28 (Fig. 1) which is provided with a worm 29 in meshing engagement with a gear 30 secured to the shaft 21. The outer projecting end of this shaft 28 may be provided with a polygonal socket 31 for removably receiving a suitable operating crank W for imparting rotation to the shaft. In order to more firmly support housings 27, brackets 27a may be provided as indicated.

While various other shaft operating means may be provided, the worm and gear arrangement provides for easy operation and also serves as an effective lock to hold the shaft in any desired rotated position without ratchets etc.

The improved auxiliary hitch and load stabilizer is highly simple in construction in that it comprises only a pair of bearing sleeves or pivot members, a pair of resilient rods, a pair of chains, and chain operating means.

The improved auxiliary hitch and load stabilizer is shown in Fig. 1 in initially attached and inoperative position and wherein the usual ball and socket hitch is illustrated in the sagging position which it assumes in the absence of an equalizing and stabilizing means. To render the device operative, the shaft 21 is rotated through the cooperating worm and gear 29, 30 whereby rotation is imparted to the sprocket wheels 19.

Upon rotation of the sprocket wheels, which will amount to no more than a single rotation thereof, the chains 18 will tension the free or rear ends of the rods 11, upwardly to substantially the position shown in Fig. 2.

This lifting of the rear ends of the rods 11 will result in bending of the rods and importation of substantial stress therein. The tensioning of the rods from the trailer extension will result in upward pressure on the pivoted ends 13 of the rods in an amount substantially equal to the load on the chains. This operation will result in lifting of the sagging ball and socket joint S, $b$ to a position wherein the trailer extension E will be substantially horizontal and the load will be properly equalized not only on the front and rear wheels of the automobile A, but also on the trailer body.

The enlargements 14 at the knuckles of the rods 11 are disposed just below the lower open ends of the bearing sleeves 10. These thickened portions serve to strengthen the angular bent area of the rods between the straight portions 13 and 13 and thus cause uniform distribution of the bending force throughout the length of the rod portion 13, between the enlargement 14 and the adjustable sleeve 15, as shown in Fig. 3. Breakage through sharp bending and resulting crystallization of the metal at the knuckles of the rods is thus presented.

The structure in the operative position shown in Figs. 2 and 5 is both yieldable and flexible and serves to support and maintain the automobile and trailer in properly balanced relation under all road driving conditions. It is to be particularly noted that with the structure in normal operative position, as in Figs. 2 and 5, the substantial stress in the rods 11 is at a minimum. Upon turning or upon encountering irregularities in the roadway, the rods 11 will also pivot in the bearing sleeves 10, causing the opposite ends of the rods to move forward or backward and/or to one side or the other. The tensioning chains will then be forced to a position out of their normal vertical positions, with the result that the free ends of the rods will be drawn up nearer to the supporting beam B resulting in increased tensioning of the rods under such deflection. Accordingly such increased tension will act to again reestablish a normal position of the rods with the result that the hitch will tend to right itself and the attached vehicles under all driving conditions.

There are two independent yet cooperative couplings provided by the socketed frame extension E and the pivoted rods 11 with the drawbar d, thus preventing accidental separation of the automobile and trailer. A hitch possessing exceptional safety features results from the combination and arrangement of parts herein shown and described.

While I have disclosed my invention in accordance with a single structural embodiment thereof, such is to be considered as illustrative only, and not restrictive, the scope of the invention being defined in the sub-joined claims.

What I claim and desire to secure by U. S. Letters Patent is:

1. An auxiliary automobile-trailer hitch comprising a pair of elongated vertical axis pivot means for attachment to the automobile at laterally opposite sides of an articulated joint between same and the trailer, a pair of normally straight spring rods having angular end portions snugly receivable within said pivot means for pivotal movement of the rods horizontally only, a pair of generally vertically disposed flexible suspension members having corresponding ends thereof connected to the free ends of said rods, and power means for support on said trailer above said rods and operatively engaged with the opposite ends of said flexible suspension members for bending and tensioning the rod.

2. The structure according to claim 1, wherein said angular end portions of said rods are disposed at an angle of more than 90° to the elongated body portions thereof and the juncture of the angular end portion and elongated body portion being substantially thickened to resist flexing of said juncture.

3. In combination with an automobile-trailer hitch, including a drawbar projecting rearwardly of the automobile and an extension projecting forwardly of the trailer and a universal joint between the rear end of the drawbar and the forward end of the extension; an auxiliary hitch comprising a pair of elongated normally straight resilient rods having corresponding angularly disposed end portions pivotally supported on vertical axes on said drawbar at laterally opposite sides of said universal joint for horizontal pivotal movement only, said rods extending rearwardly in diverging relation with their free ends disposed below said extension and adjacent said trailer, flexible suspension members having corresponding ends thereof secured to said free ends of the rods, and power means supported on said extension above said rods to which the opposite ends of said flexible members are secured and upon operation of which the free ends of the rods are drawn upwardly with a resulting bending and tensioning of the rods, whereby said universal joint connection is yieldably urged upwardly for substantial equalization of the load on the automobile and trailer.

4. The structure according to claim 3, wherein said end portions of the rods are disposed at an angle of more than 90° to the body portions thereof to provide for substantial tensioning of the body portions of the rods with same supported substantially in horizontal position when in load equalizing condition, and the angles between said end portions and said body portions being reenforced.

5. The structure according to claim 3, wherein said rod end portions are pivotally supported in sleeves rigidly connected to opposite sides of said drawbar, and the upper ends of said sleeves being closed to provide thrust bearings for the free ends of said rod end portions.

6. The structure according to claim 3, wherein said flexible members comprise sprocket chains, and wherein said power means include a shaft rotatably supported on said extension, sprocket wheels secured to said shaft with which said chains are operatively engaged, and worm and gear means for rotating said shaft and retaining same in any rotated position.

7. In combination with an automobile-trailer hitch including a drawbar projecting rearwardly of the automobile, an extension projecting forwardly of the trailer, and a universal joint connection between the rear end of the drawbar and the forward end of the extension; load equalizing and draft stabilizing means comprising a pair of sleeves secured to said drawbar at opposite sides of said universal joint connection, and having closed upper ends, a pair of resilient rods including elongated body portions and end portions in substantially right angular relation thereto, said end portions being supported within said sleeves for rotation about vertical axes, and manually operable means supported by said extension and including flexible members depending from said extension and connected with the free ends of the body portions of said rods for raising same and placing said rods under substantial tension, whereby said end portions react on the closed ends of said sleeves to urge said universal joint connection upwardly for load equalization and draft stabilization.

8. The structure according to claim 7, wherein said flexible members are normally in vertical position between said extension and said free ends of the rods, the said rotational support of the rods within said sleeves and said flexible members permitting said rods to move substantially in a horizontal plane upon turning of the automobile or upon irregularities in the roadbed, said movement of the rods causing said flexible members to move out of their normal vertical positions with a resulting increased tension in the rods and which increased tension automatically urges the rods to their normal stressed positions.

9. The structure according to claim 7, wherein said flexible members are longitudinally adjustably connected to the elongated body portions of said resilient rods.

MARTIN H. MATHISEN.

REFERENCES CITED

The following references are of record in the file of this patent:

UNITED STATES PATENTS

| Number | Name | Date |
|---|---|---|
| 2,453,941 | Smit | Nov. 16, 1948 |
| 2,549,814 | Hume | Apr. 24, 1951 |